US012608266B2

(12) United States Patent
Shah et al.

(10) Patent No.: US 12,608,266 B2
(45) Date of Patent: Apr. 21, 2026

(54) APPARATUS, SYSTEM, AND METHOD FOR DETECTING PHYSICAL INFRASTRUCTURE CONSTRAINT VIOLATIONS

(71) Applicant: Advanced Micro Devices, Inc., Santa Clara, CA (US)

(72) Inventors: Siddharth K. Shah, Austin, TX (US); Vilas Sridharan, Boxborough, MA (US); Amitabh Mehra, Fort Collins, CO (US); Anil Harwani, Austin, TX (US); William Fischofer, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/957,948

(22) Filed: Sep. 30, 2022

(65) Prior Publication Data

US 2024/0111622 A1      Apr. 4, 2024

(51) Int. Cl.
*G06F 11/07* (2006.01)
*G06F 11/30* (2006.01)

(52) U.S. Cl.
CPC ...... *G06F 11/0793* (2013.01); *G06F 11/0721* (2013.01); *G06F 11/0766* (2013.01); *G06F 11/079* (2013.01); *G06F 11/30* (2013.01); *G06F 11/3058* (2013.01)

(58) Field of Classification Search
CPC .. G06F 11/0793; G06F 11/0721; G06F 11/07; G06F 11/0766; G06F 11/30; G06F 11/3051; G06F 11/3058; G06F 11/3065; G06F 11/3466
See application file for complete search history.

(56) References Cited

U.S. PATENT DOCUMENTS

| | | | | |
|---|---|---|---|---|
| 10,783,311 | B2 | 9/2020 | Studders | |
| 2003/0142449 | A1* | 7/2003 | Iwata | H02H 1/0015 |
| | | | | 361/87 |
| 2005/0105702 | A1* | 5/2005 | Kagawa | H04N 1/0001 |
| | | | | 379/1.01 |
| 2006/0253740 | A1* | 11/2006 | Ritz | G06F 11/0781 |
| | | | | 714/38.13 |
| 2013/0278235 | A1* | 10/2013 | Divan | G05F 1/12 |
| | | | | 323/282 |
| 2013/0339829 | A1* | 12/2013 | Vargas | G06F 11/1004 |
| | | | | 714/807 |

(Continued)

OTHER PUBLICATIONS

International Search Report and Written Opinion received for International Application No. PCT/US2023/075464, mailed on Jan. 23, 2024; 9 pages.

*Primary Examiner* — Yolanda L Wilson
(74) *Attorney, Agent, or Firm* — Greenberg Traurig, LLP; Andrew J. Tibbetts

(57) ABSTRACT

A disclosed method can include (i) reporting, by a microcontroller, detection of a violation of a physical infrastructure constraint to a machine check architecture, (ii) triggering, by the machine check architecture in response to the reporting, a machine-check exception such that the violation of the physical infrastructure constraint is recorded, and (iii) performing a corrective action based on the triggering of the machine-check exception. Various other apparatuses, systems, and methods are also disclosed.

20 Claims, 5 Drawing Sheets

(56) References Cited

U.S. PATENT DOCUMENTS

| | | | | |
|---|---|---|---|---|
| 2014/0281757 A1* | 9/2014 | Lukas | ................. | G06F 11/0757 |
| | | | | 714/57 |
| 2014/0380085 A1* | 12/2014 | Rash | .................. | G06F 11/1415 |
| | | | | 714/49 |
| 2015/0186231 A1* | 7/2015 | Auld | .................. | G06F 11/0793 |
| | | | | 714/27 |
| 2019/0205201 A1* | 7/2019 | Panda | .................. | G06F 11/079 |
| 2019/0391868 A1* | 12/2019 | Chaudhari | ......... | G06F 11/0721 |
| 2020/0133232 A1 | 4/2020 | Deroo | | |
| 2020/0301773 A1* | 9/2020 | Porwal | ............... | G06F 11/0793 |
| 2021/0224443 A1 | 7/2021 | Huang | | |
| 2021/0357204 A1 | 11/2021 | Nachimuthu | | |
| 2022/0215149 A1 | 7/2022 | Hsu | | |

* cited by examiner

100

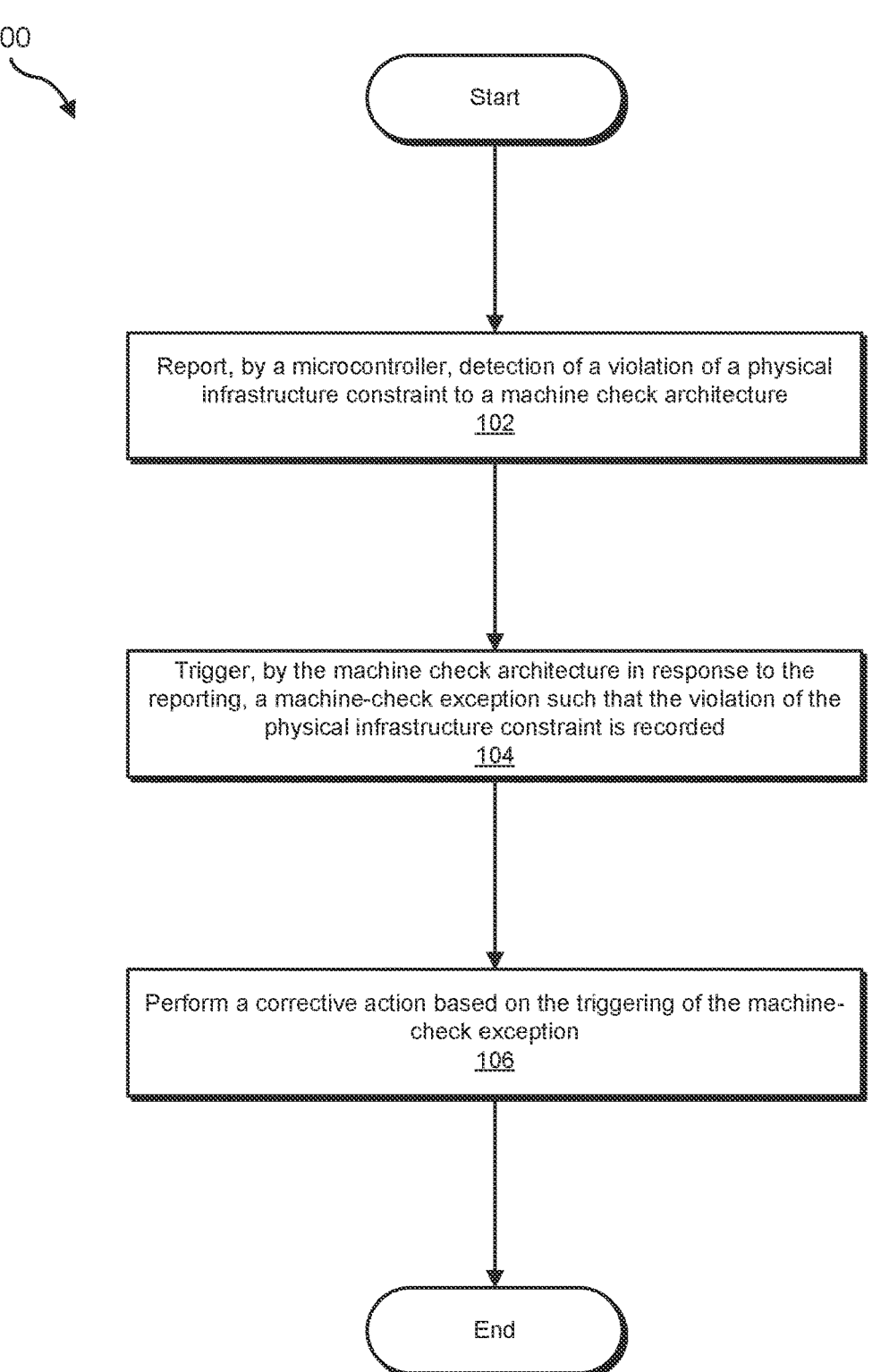

Start

Report, by a microcontroller, detection of a violation of a physical infrastructure constraint to a machine check architecture
102

Trigger, by the machine check architecture in response to the reporting, a machine-check exception such that the violation of the physical infrastructure constraint is recorded
104

Perform a corrective action based on the triggering of the machine-check exception
106

End

*FIG. 1*

APPARATUS, SYSTEM, AND METHOD FOR DETECTING PHYSICAL INFRASTRUCTURE CONSTRAINT VIOLATIONS

BACKGROUND

Modern computer chips can implement a number of different features to detect errors and to facilitate debugging. In this context, this application discloses improved apparatuses, systems, and methods for detecting physical infrastructure constraint violations.

BRIEF DESCRIPTION OF THE DRAWINGS

The accompanying drawings illustrate a number of exemplary variations and are a part of the specification. Together with the following description, these drawings demonstrate and explain various principles of the instant disclosure.

FIG. 1 shows a flow diagram for an illustrative method for detecting physical infrastructure constraint violations.

Figure 2:
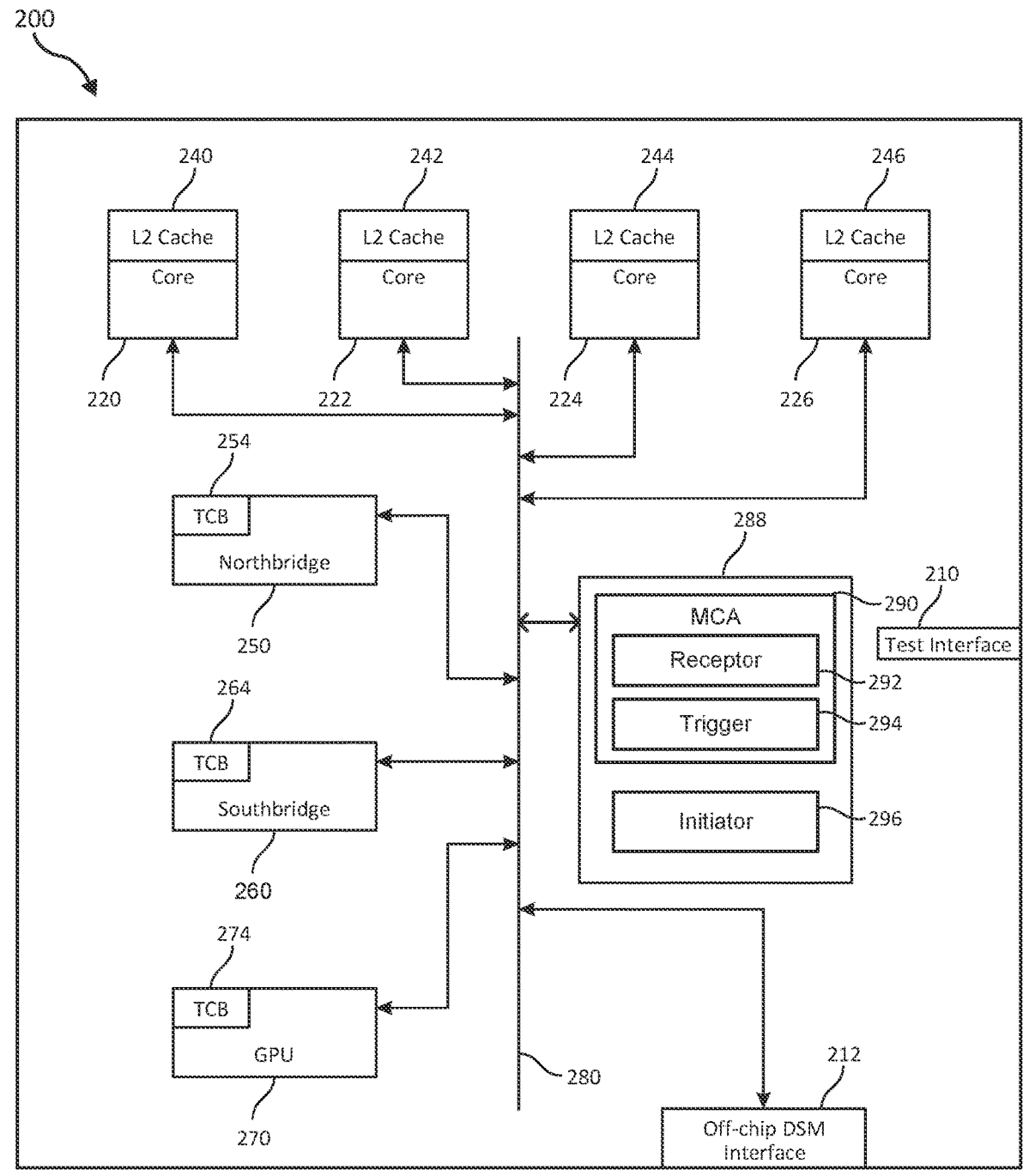
FIG. 2 shows a block diagram of an illustrative system on a chip.

Throughout the drawings, identical reference characters and descriptions indicate similar, but not necessarily identical, elements. While the exemplary variations described herein are susceptible to various modifications and alternative forms, specific variations have been shown by way of example in the drawings and will be described in detail herein. However, the exemplary variations described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for detecting physical infrastructure constraint violations. Modern computing microprocessors can feature machine check architectures and corresponding machine-check exception functionality that report errors to operating systems or other software components. These mechanisms can detect and report hardware or machine errors, such as system bus errors, errors caused by communication over noisy channels, parity errors, cache errors, and translation lookaside buffer errors, for example. Nevertheless, these related methodologies might not necessarily detect lower-level violations of physical infrastructure constraints. In other words, physical or hardware components of a modern computing system can feature physical infrastructure constraints in terms of voltage, power, sustained current, peak current, or temperature, etc.

More generally, as used herein, the term "physical infrastructure constraint" generally refers to a constraint defined in terms of a physical or performance-related property of a corresponding physical or hardware component of a computing device, such that the property should not satisfy a threshold (e.g., maximum or minimum threshold) or should not satisfy the threshold beyond a certain amount of time, as discussed further below. Accordingly, these components should not achieve values that violate these constraints (e.g., violate the constraints for greater than a predetermined amount of time). In some examples, the physical infrastructure constraint can be violated even if the violation has not yet caused a corresponding physical or hardware component to fail.

As one illustrative example, a particular wire or lead can have an electrical design current constraint that specifies a maximum value of current to go across that wire or lead. Accordingly, the wire or lead should not carry current beyond that maximum value or should not carry current beyond that maximum value for a predetermined amount of time, and yet the wire or lead can continue to carry such current, while violating the constraint, without the wire or lead failing. Nevertheless, over a sufficient amount of time, the physical component will tend to fail, which is one purpose behind the physical infrastructure constraints being imposed. This also presents another reason why it is important to monitor for violations of such constraints, yet modern machine check architectures and corresponding machine-check exception functionality might have no visibility into such violations.

As will be described in greater detail below, the instant disclosure generally relates to apparatuses, systems, and methods for detecting physical infrastructure constraint violations. In one example, a method can include (i) reporting, by a microcontroller, detection of a violation of a physical infrastructure constraint to a machine check architecture, (ii) triggering, by the machine check architecture in response to the reporting, a machine-check exception such that the violation of the physical infrastructure constraint is recorded, and (iii) performing a corrective action based on the triggering of the machine-check exception.

In some examples, the microcontroller includes a system management unit.

In some examples, the violation of the physical infrastructure constraint is defined in terms of at least one of voltage, power, sustained current, peak current, or temperature.

In some examples, the violation of the physical infrastructure constraint includes a violation of an electrical design current constraint.

In some examples, the corrective action includes at least one of logging, reporting, or profiling a telemetry event.

In some examples, the corrective action is performed by a prediction and prevention engine.

In some examples, the corrective action is performed as part of a debugging diagnosis.

In some examples, the corrective action includes entering a debugging mode or resetting a processor.

In some examples, the violation of a physical infrastructure constraint is detected prior to the violation causing any physical component to fail.

In some examples, the microcontroller and the machine check architecture are disposed on a system on a chip.

In further examples, a machine check architecture includes (i) a receptor that receives, from a microcontroller, a report of a violation of a physical infrastructure constraint, (ii) a trigger that triggers, in response to receiving the report, a machine-check exception such that the violation of the physical infrastructure constraint is recorded, and (iii) an initiator that initiates a corrective action based on the recording of the violation of the physical infrastructure constraint.

In further examples, a system can include a microcontroller that issues a report of a violation of a physical infrastructure constraint and a machine check architecture that triggers, in response to receiving the report, a machine-check exception such that the violation of the physical infrastructure constraint is recorded and that initiates a corrective action based on the recording of the violation of the physical infrastructure constraint.

FIG. 1 shows a flow diagram for a method 100 for detecting physical infrastructure constraint violations. The steps of method 100 can be performed by the various apparatuses, microcontrollers, machine check architectures, and/or systems that are described herein. For example, at step 102, a microcontroller can report detection of a violation of a physical infrastructure constraint to a machine check architecture. As used herein, the term "microcontroller" generally refers to a compact integrated circuit designed to govern an operation within an embedded system, for example.

To help provide context for the background environment in which method 100 can be performed, FIG. 2 shows an illustrative block diagram of a system-on-a-chip. The system-on-a-chip can include both the microcontroller and the machine check architecture that are discussed further below.

In an exemplary variation, SOC 200 includes a plurality of processing cores 220, 222, 224, 226, a plurality of trace data storage elements 240, 242, 244, 246, 254, 264, 274 (e.g., L2 caches and Trace Capture Buffers (TCBs)), a Northbridge 250 (or memory controller), a Southbridge 260, a GPU 270, and a cross trigger bus 280. Cross triggering to debugging state machines (not illustrated) on another die within the same package (e.g., in an MCM) and/or other packages can be achieved via off-chip debugging state machine interface 212.

Although SOC 200 is illustrated as including four cores 220, 222, 224, 226, an SOC can include more or fewer cores, in other variations (including as few as one single core). In addition, although SOC 200 is illustrated as including a single Northbridge 250, Southbridge 260, and GPU 270, some or all of these electronic modules can be excluded from SOC 200 (e.g., they can be located off-chip) in other variations. Furthermore, although SOC 200 is illustrated as including only one Northbridge 250, an SOC can include more than one Northbridge, in other variations. Besides the processing components and busses illustrated in FIG. 2, a SOC can include additional or different processing components, busses, and other electronic devices and circuitry, in other variations.

Processing cores 220, 222, 224, 226 generally represent the main processing hardware, logic and/or circuitry for the SOC 200, and each processing core 220, 222, 224, 226 can be realized using one or more arithmetic logic units (ALUs), one or more floating point units (FPUs), one or more memory elements (e.g., one or more caches), discrete gate or transistor logic, discrete hardware components, or any combination thereof. Although not illustrated in FIG. 2, each processing core 220, 222, 224, 226 can implement its own associated cache memory element (e.g., a level one or L1 cache) in proximity to its respective processing circuitry for reduced latency.

Northbridge 250, which also can be referred to as a "memory controller," in some systems, is configured to interface with I/O peripherals (e.g., I/O peripherals 140, FIG. 1) and memory (e.g., memory 150, FIG. 1). Northbridge 250 controls communications between the components of SOC 200 and the I/O peripherals and/or external memory. Southbridge 260, which also can be referred to as an "I/O controller hub," in some systems, is configured to connect and control peripheral devices (e.g., relatively low speed peripheral devices). GPU 270 is a special purpose microprocessor that offloads and accelerates graphics rendering from cores 220, 222, 224, 226.

In the illustrated variation, caches 240, 242, 244, 246 and TCBs 254, 264, 274 provide intermediary memory elements having reduced size relative to external memory for temporarily storing data and/or instructions retrieved from external memory or elsewhere, and/or data produced by processing cores 220, 222, 224, 226, Northbridge 250, Southbridge 260, and GPU 270. For example, in a variation, caches 240, 242, 244, 246 and TCBs 254, 264, 274 provide memory elements for storing debug information (or "trace data") collected and/or produced by debugging state machines during debug operations associated with the respective electronic modules with which they are integrated. In the illustrated variation, caches 240, 242, 244, 246 are in close proximity to and coupled between a respective processing core 220, 222, 224, 226 and the Northbridge 250. In this regard, caches 240, 242, 244, 246 can alternatively be referred to as core-coupled caches, and each core-coupled cache 240, 242, 244, 246 maintains data and/or program instructions previously fetched from external memory that were either previously used by and/or are likely to be used by its associated processing core 220, 222, 224, 226. Caches 240, 242, 244, 246 are preferably larger than L1 caches implemented by the processing cores 220, 222, 224, 226 and function as level two caches (or L2 caches) in the memory hierarchy. SOC 200 can also include another higher level cache (e.g., a level three or L3 cache, not illustrated) that is preferably larger than the L2 caches 240, 242, 244, 246.

In an exemplary variation, the SOC 200 includes a test interface 210 that comprises a plurality of pins dedicated for use in testing and/or configuring the functionality of the SOC 200. In one variation, the test interface 210 is compliant with the IEEE 1149.1 Standard Test Access Port and Boundary-Scan Architecture, that is, the Joint Test Action Group (JTAG) standards.

FIG. 2 also illustrates how SOC 200 can further include a subsystem 288 for the performance of method 100. Subsystem 288 may further include a machine check architecture 290 (MCA). Machine check architecture 290 may include a receptor 292, which can perform step 102 of method 100, and a trigger 294, which can perform step 104 of method 100, as discussed further below. Moreover, subsystem 288 can also further include initiator 296 for the performance of step 106, as further discussed below. Subcomponents 292-296 can be implemented in terms of hardware or logic within SOC 200 and/or one or more of these may be implemented as firmware or software components in coordination with the hardware-based MCA.

As discussed above, the technology of this application can modify or improve upon machine check architectures and corresponding machine-check exception functionality. Accordingly, the following provides an overview of a machine check architecture and its corresponding machine-check exception functionality.

Figure 3:
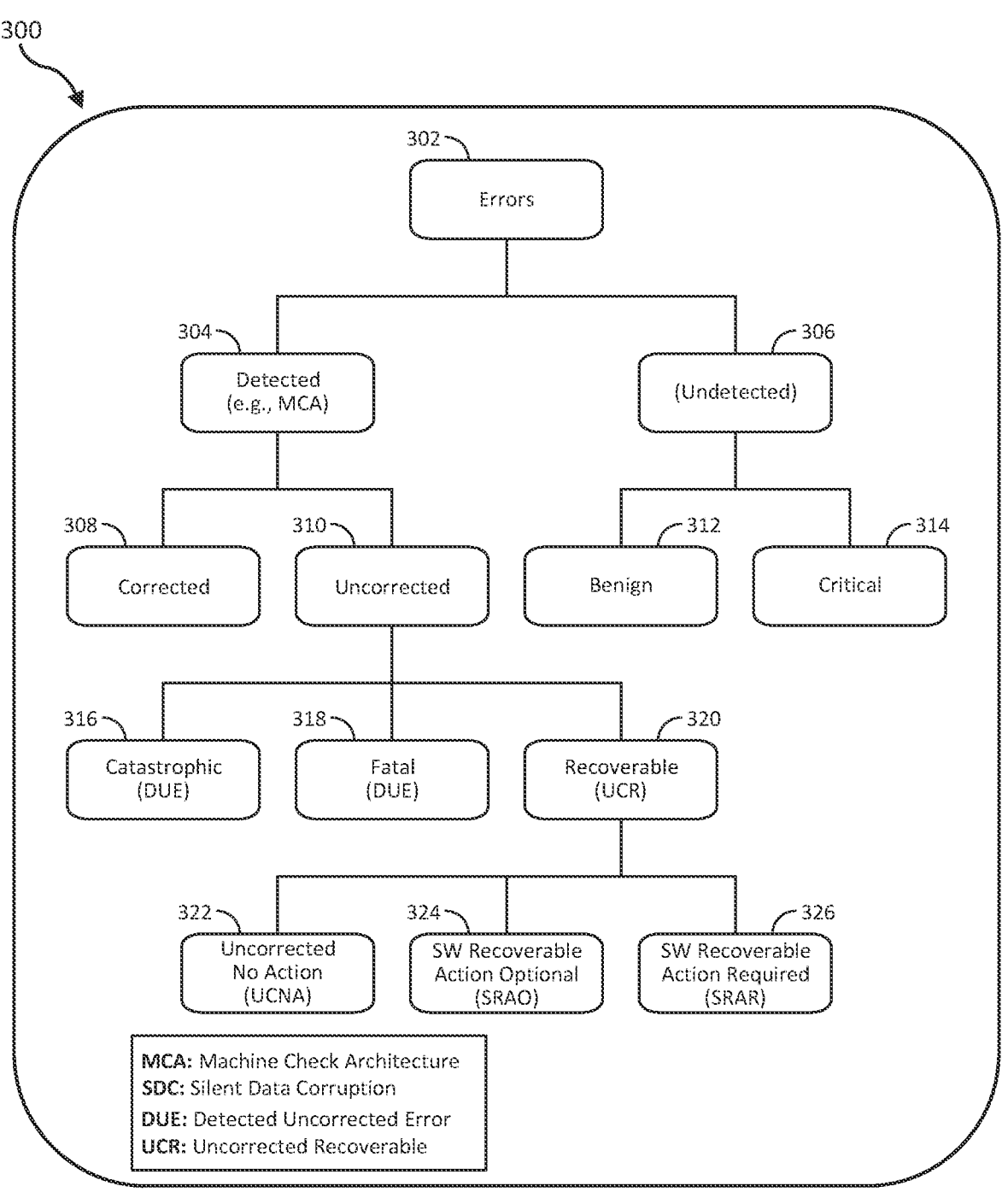
FIG. 3 shows a block diagram of a taxonomy of detected and undetected errors within a computing environment.

An MCA such as MCA 290 can refer to a processor-centric error detection and reporting mechanism. FIG. 3 shows a helpful taxonomy 300 that decomposes system errors 302 into sets. The two main sets are detected errors 304 and undetected errors 306. The undetected errors, while they can be important, are not handled by an MCA. Undetected errors can include benign errors 312 and critical errors 314.

Detected errors can be divided into corrected errors 308 and uncorrected errors 310. Corrected errors are benign after they have been corrected. Despite being benign, these errors can still be reported to software for purposes of tracking.

Some errors should indicate that errors are expected and so it is helpful to monitor for them. Uncorrected errors can include three different sets: catastrophic errors 316, fatal errors 318, and recoverable errors 320. Both catastrophic errors and fatal errors trigger a system to reset. Uncorrected recoverable errors (UCR) have might allow the system to still function, and these can be classified into uncorrected no action errors 322, software recoverable action optional errors 324, and software recoverable action required errors 326.

Figure 4:
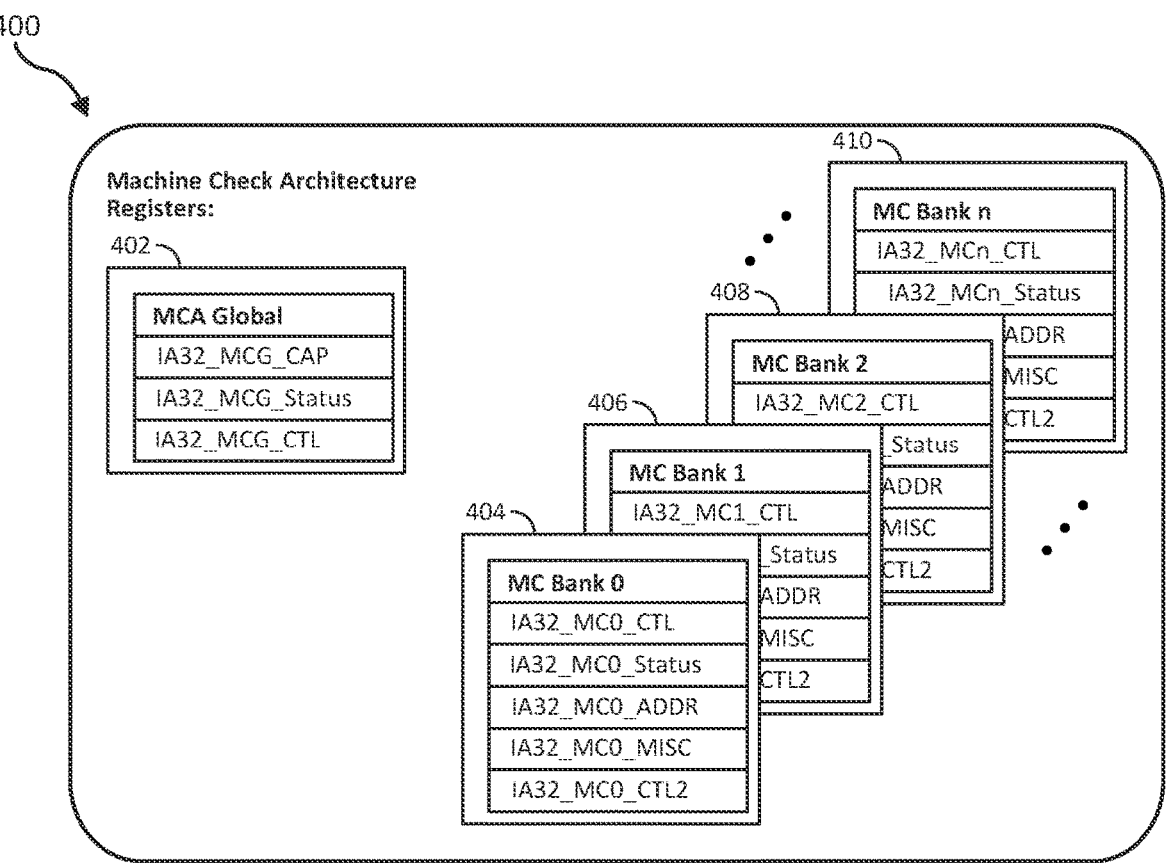
FIG. 4 shows a block diagram of illustrative examples of machine check architecture registers.

Given these error sets when detected by a hardware component, functionality has been created for alerting software (such as firmware, BIOS, operating system, or hypervisors) of the errors. Remedial actions can include two versions, recording and reporting. Recording may be performed by recording data into Machine Check (MC) registers, as shown in FIG. 4 where it can be reviewed by software and saved onto memory. As further shown in FIG. 4, MC registers 400 include a set of global registers 402 and a set of banked registers 404-410. Reporting can use a CMCI and NICE report. CMCI (Corrected Machine Check Interrupt) functionality can report corrected errors (CE) and uncorrected recoverable errors (UCR) such as uncorrected no action (UCNA) recoverable errors. NICE (machine-check exception) reporting can address uncorrected recoverable errors such as software recoverable action optional (SRAO) and software recoverable action required (SRAR) errors, which are listed above. This functionality can also report catastrophic errors that involve rebooting the system. In the scenarios outlined above, data regarding the event may be saved into a MC banks prior to reporting.

Returning to method 100 of FIG. 1, step 102 can be performed by a microcontroller that detects a violation of a physical infrastructure constraint. As further discussed above, the physical infrastructure constraint can refer to a maximum value or the threshold defining a property for a physical or hardware component that should be avoided. Accordingly, illustrative examples of such physical infrastructure constraints can include constraints in terms of voltage, power, sustained current, peak current, or temperature.

In one illustrative example, the microcontroller can correspond to a system management unit (SMU). The system management unit can be a subcomponent of a larger processor (e.g., an SOC), and this subcomponent can be responsible for a variety of system and power management tasks during boot and runtime. The system management unit can contain a thermal block, which can further contain features related to temperature sensing, control, and reporting. The thermal block can include temperature collection and calculation logic, fan speed control for off-chip fans, and temperature reporting functionality. The system management unit can also include a number of registers, which can provide a current control temperature among other outputs.

Returning to FIG. 1, at step 104 one or more of the apparatuses or systems described herein can trigger a machine-check exception such that the violation of the physical infrastructure constraint is recorded. For example, a machine check architecture, as further described above, can perform step 104. As used herein, the corrective action may refer to any action performed to correct an error.

Figure 5:
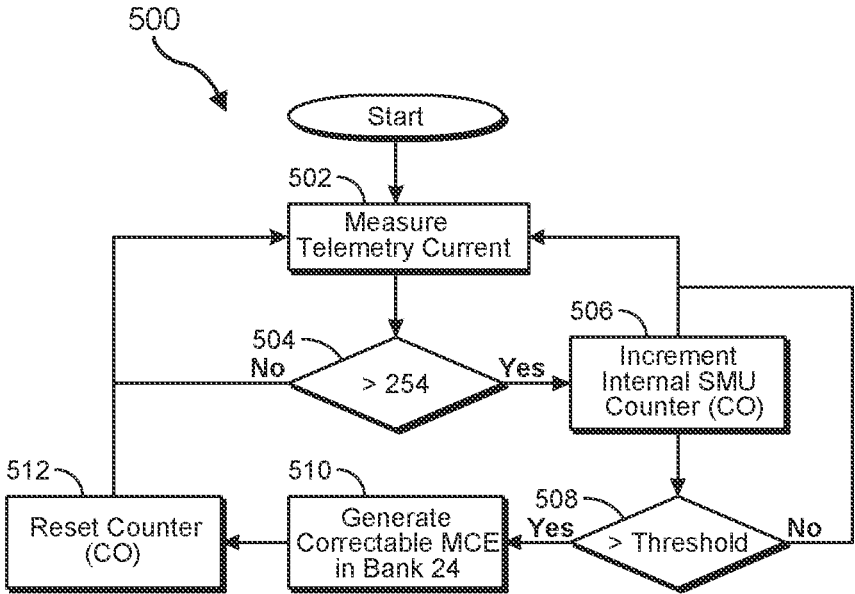
FIG. 5 shows a flow diagram of an illustrative method for detecting physical infrastructure constraint violations in one variation.

FIG. 5 shows an illustrative flow diagram 500 for a more detailed method for detecting and reporting physical infrastructure constraint violations. The example of this method focuses on a physical infrastructure constraint in terms of an electrical design current constraint. Nevertheless, those having skill in the art can appreciate that the overall concept and functionality of FIG. 5 can be applied in parallel to other types of physical infrastructure constraints, such as constraints defined in terms of voltage, power, temperature, etc.

The concept reflected in FIG. 5 resulted in part from electrical design current constraint debugging procedures on a hardware accelerator. The corresponding system, when running a workload through the hardware accelerator, tripped a temperature constraint due to crossing electrical design current limitations. In an attempt to ascertain the root cause of this problem, it was helpful to obtain an understanding of the specific software components causing the issue and correlating this issue to electrical design current parameters. A result of these investigations led to having the system management unit communicate with the machine check architecture as an indication that the system is in a dangerous zone. Accordingly, appropriate predefined actions can be taken once the machine check architecture gets the indication of the physical infrastructure constraint violation from the microcontroller. This methodology enables greater control in response to such constraint violations, as well as allows triggers to study the corresponding software through kernel logs or through the usage of hardware debugging tools.

As one illustrative example, the system management unit can work in conjunction with the machine check architecture hardware to assist in debugging of telemetry events that are caused due to crossing an electrical design current limitation or other physical infrastructure constraint. When the technology of this application is enabled, a microcontroller provide signaling to the machine check architecture as a trigger for corresponding hardware components to take appropriate action. These actions can be just logging that the events occurred and/or performing more active debugging steps in terms of writing specific data to memory or performing debugging through the usage of machine check breakpoints.

One illustrative example for applying the methodology corresponds to method 500 of FIG. 5. When this feature is enabled at step 502 the system management unit starts measuring an electrical design current (EDC), which can correspond to a specialized value that represents a peak current that a physical component, such as a voltage regulator module, can handle on a short-term basis. According to the methodology of method 500, if that value reaches a predefined threshold at comparison step 504 (i.e., 254 in the example of FIG. 5), then an internal counter can be incremented at step 506. The system management unit can loop through these steps (see FIG. 5) until the internal counter reaches a predefined threshold at comparison step 508. Once the threshold is achieved the system management unit generates a correctable machine-check exception at step 510, which can be triggered in machine check bank 24 (see FIG. 4). Step 510 can correspond to a specific implementation of step 104 of method 100 shown in FIG. 1, as further discussed above. Once the machine-check exception is logged or recorded, all other counters can be reset at step 512 and the process can be repeated.

As further discussed above, the flow diagram of FIG. 5 focuses on a violation of a constraint in terms of electrical design current. Nevertheless, the technology of this application can also apply to other physical infrastructure constraints, such as constraints in terms of voltage (set voltage and load voltage), power, clock frequency, and temperature, etc. In some illustrative examples, computer code can use four bits to represent a clock frequency limit value, a Boolean value to represent a current power state, three bits to represent load voltage, and/or five bits as a range for set voltage.

Returning to FIG. 1, at step 106 one or more of the systems described herein can perform a corrective action based on the triggering of the machine-check exception. For example, certain software components (BIOS, firmware, operating system, and/or hypervisors) can perform the corrective action in response to the triggering of the machine-check exception.

As outlined above, the machine check architecture provides a mechanism for hardware or low-level logic to detect a violation of a physical infrastructure constraint and to report this detection to a corresponding software component. In response to the machine-check exception, the corresponding software components such as an operating system can perform one or more corrective actions. These corrective actions can include logging, reporting, or profiling a telemetry event. Logging the telemetry event can simply involve storing data and metadata describing the telemetry event within memory. Reporting the telemetry event can involve reporting the telemetry event to another software component or to a user or administrator, which can take further action to address the violation of the physical infrastructure constraint. Profiling the telemetry event can involve, in some examples, categorizing or classifying the tele event, as well as ascertaining one or more causes or reasons for the telemetry event. Generally speaking, the telemetry event can refer to the reporting of a violation of a physical infrastructure constraint, as further outlined above.

In some examples, the corrective action is performed by a prediction and prevention engine. In these examples, the machine check architecture in coordination with one or more higher-level software components can, in aggregate, form a prediction and prevention engine. The prediction and prevention engine can be useful because the engine can monitor for, identify, and remediate violations of physical infrastructure constraints even before these violations result in one or more physical components failing. Accordingly, the prediction and prevention engine can improve upon related machine check architecture configurations that are effectively limited to detecting hardware or other physical component failures (i.e., detecting these physical component failures after they have already occurred). In contrast to such related methodologies, the technology of this application can identify a violation of a physical infrastructure constraint that will tend to result in eventual failing of a corresponding physical component but can identify this violation prior to the actual failure of the component. As one illustrative example, the technology of this application can detect the violation of an electrical design current constraint, and yet can detect this violation prior to the corresponding physical component, such as a wire, lead, or voltage regulator, actually failing. In other words, the technology of this application can predict that a physical or hardware component can fail eventually, due to the violation of the physical infrastructure constraint, and can prevent such a failure from actually occurring because the violation was detected sufficiently early, as further discussed above.

In some examples, the corrective action can be performed as part of a debugging diagnosis. For example, in a laboratory environment or in the field, operation or execution of one or more software, firmware, or hardware components can result in output that deviates from intended design specifications. For example, during the development of a software, firmware, or hardware component one or more "bugs" or undesirable instances of functionality or unintended results can furthermore result in the violation of a corresponding physical infrastructure constraint. Accordingly, the developers can enter one or more debugging procedures in an attempt to ascertain the root cause of this undesired functionality and/or to develop a remedy that eliminates the corresponding "bug." As one illustrative example, a bug or failure of optimization in a software, firmware, or hardware component can result in a violation of an electrical design current constraint. Other corresponding physical infrastructure constraints can include constraints defined in terms of clock speed, voltage, or temperature, etc., as further discussed above. Accordingly, when the "bug" causes the violation of such a physical infrastructure constraint, this violation can be detected by the technology of this application through the machine check architecture, thereby enabling one or more software components, administrators, or developers to perform a corrective action. In some simple examples, the corrective action can correspond to entering a debugging mode or resetting a processor.

In summary, this application is directed to technology that can use an on-chip microcontroller, such as a system management unit, in conjunction with machine check architecture registers, to assist in logging, reporting, and profiling of telemetry events within a computing environment. As further discussed above, an illustrative example of such telemetry events can include violations of an electrical design current limitation or constraint. The technology can be used as a failure prediction and prevention engine, which can be used to perform lab debugging or field diagnosis. The technology can also be used to take corrective measures on critical events, such as entering a debugging mode, resetting a processor, or any other suitable and programmable action. When the feature of this technology is enabled, the microcontroller can provide signaling to the machine check architecture as a trigger for corresponding hardware components to take appropriate failure prevention actions or to log debugging data for diagnosis.

The technology of this application can improve upon related methodologies in a variety of ways. As one example, a control loop in the context of thermal throttling can perform similar functionality, but that control loop can lack any error reporting or any user-configurable corrective actions. Similarly, in some related-methodologies a microcontroller (e.g., a system management unit or platform security processor) can log a machine check architecture event due to a failure of the microcontroller itself (e.g., poison data consumption). Nevertheless, these additional cases are different than the improved technology described herein, because these cases can involve logging and reporting the physical defects or cosmic background radiation (e.g., soft error rate) events rather than reporting violations of physical infrastructure constraints, which are not necessarily failures yet and which are not necessarily directly related to operation of the corresponding microcontroller.

The implementations described within this application can relate to improving or modifying the configuration of the machine check architecture to enable monitoring, reporting, detection, and prevention of physical infrastructure constraint violations (e.g., voltage, current, temperature, etc.) rather than just detecting higher-level errors such as data corruption. Related machine check architectures do not necessarily check for lower or physical level violations of constraints in terms of values such as current and temperature.

The examples described in this application directly address the problem of correlating physical infrastructure values with the micr-architecrutal or software context of a modern SOC and provide a solution that will enable SOCs to avoid potential catastrophic events that are a result of physical infrastructure constraint violations. The technology of this application will also assist with at scale debugging of such events by providing enhanced logging via the existing scalable machine check architecture without any system software intervention.

The various processors described herein can include and/ or represent any type or form of hardware-implemented device capable of interpreting and/or executing computer-readable instructions. In one example, the processor can include and/or represent one or more semiconductor devices implemented and/or deployed as part of a computing system. One example of the processor includes central processing units (CPUs) and microprocessors. Other examples, depending on context, can include microcontrollers, field-programmable gate arrays (FPGAs) that implement softcore processors, application-specific integrated circuits (ASICs), systems on a chip (SoCs), portions of one or more of the same, variations or combinations of one or more of the same, and/or any other suitable processor.

The processor can implement and/or be configured with any of a variety of different architectures and/or microarchitectures. For example, the processor can implement and/or be configured as a reduced instruction set computer (RISC) architecture or the processor can implement and/or be configured as a complex instruction set computer (CISC) architecture. Additional examples of such architectures and/or microarchitectures include, without limitation, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

In some examples, the processor can include and/or incorporate one or more additional components that are not explicitly represented and/or illustrated in the figures. Examples of such additional components include, without limitation, registers, memory devices, circuitry, transistors, resistors, capacitors, diodes, connections, traces, buses, semiconductor (e.g., silicon) devices and/or structures, combinations or variations of one or more of the same, and/or any other suitable components.

While the foregoing disclosure sets forth various variations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The apparatuses, systems, and methods described herein can employ any number of software, firmware, and/or hardware configurations. For example, one or more of the exemplary variations and/or implementations disclosed herein can be encoded as a computer program (also referred to as computer software, software applications, computer-readable instructions, and/or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and/or other distribution systems.

In addition, one or more of the modules, instructions, and/or micro-operations described herein can transform data, physical devices, and/or representations of physical devices from one form to another. Additionally or alternatively, one or more of the modules, instructions, and/or micro-operations described herein can transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein can be shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary variations disclosed herein. This exemplary description is not intended to be exhaustive or to be limited to any precise form disclosed. Many modifications and variations are possible without departing from the spirit and scope of the instant disclosure. The variations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:

reporting, by a microcontroller, detection of a violation of a physical infrastructure constraint to a machine check architecture based on a counter reaching a threshold number of telemetry events that correspond to violations of an electrical design current (EDC) constraint;

triggering, by the machine check architecture in response to the counter reaching the threshold number of telemetry events, a machine-check exception that is classified as correctable such that the violation of the physical infrastructure constraint is recorded with metadata describing the telemetry events; and performing a corrective action based on the triggering of the machine-check exception, wherein the corrective action comprises recording metadata describing the telemetry events that correspond to violations of the EDC constraint, and wherein recording the metadata describing the telemetry events comprises, with the microcontroller, retrieving for inclusion in the metadata values from one or more registers of the microcontroller indicating physical infrastructure values monitored by the microcontroller.

2. The method of claim 1, wherein the microcontroller comprises a system management unit.

3. The method of claim 2, wherein the violation of the physical infrastructure constraint is defined in terms of at least one of voltage, power, clock frequency, sustained current, peak current, or temperature.

4. The method of claim 1, wherein the corrective action comprises reporting the telemetry events.

5. The method of claim 1, wherein the corrective action is performed by a prediction and prevention engine.

6. The method of claim 1, wherein the corrective action is performed as part of a debugging diagnosis.

7. The method of claim 1, wherein the corrective action comprises entering a debugging mode or resetting a processor.

8. The method of claim 1, wherein the violation of a physical infrastructure constraint is detected prior to the violation causing any physical component to fail.

9. The method of claim 1, wherein the microcontroller and the machine check architecture are disposed on a system on a chip.

10. A machine check architecture comprising:
  a first subcomponent that receives, from a microcontroller, a report of a violation of a physical infrastructure constraint based on a counter reaching a threshold number of telemetry events that correspond to violations of an electrical design current (EDC) constraint;
  a second subcomponent that triggers, in response to the counter reaching the threshold number of telemetry events, a machine-check exception that is classified as correctable such that the violation of the physical infrastructure constraint is recorded with metadata describing the telemetry events; and
  a third subcomponent that initiates a corrective action based on the recording of the violation of the physical infrastructure constraint, wherein the corrective action comprises recording metadata describing the telemetry events that correspond to violations of the EDC constraint, and wherein recording the metadata describing the telemetry events comprises, with the microcontroller, retrieving for inclusion in the metadata values from one or more registers of the microcontroller indicating physical infrastructure values monitored by the microcontroller.

11. The machine check architecture of claim 10, wherein the microcontroller comprises a system management unit.

12. The machine check architecture of claim 11, wherein the violation of the physical infrastructure constraint is defined in terms of at least one of voltage, power, clock frequency, sustained current, peak current, or temperature.

13. The machine check architecture of claim 10, wherein the corrective action comprises reporting the telemetry events.

14. The machine check architecture of claim 10, wherein the machine check architecture is configured to initiate the corrective action as part of a prediction and prevention engine.

15. The machine check architecture of claim 10, wherein the machine check architecture is configured to initiate the corrective action as part of a debugging diagnosis.

16. The machine check architecture of claim 10, wherein the corrective action comprises entering a debugging mode or resetting a processor.

17. The machine check architecture of claim 10, wherein the microcontroller is configured to detect the violation of the physical infrastructure constraint prior to the violation causing any physical component to fail.

18. A system comprising:
  a microcontroller that issues a report of a violation of a physical infrastructure constraint based on a counter reaching a threshold number of telemetry events that correspond to violations of an electrical design current (EDC) constraint; and
  a machine check architecture that:
    triggers, in response to the counter reaching the threshold number of telemetry events, a machine-check exception that is classified as correctable such that the violation of the physical infrastructure constraint is recorded with metadata describing the telemetry events; and
    initiates a corrective action based on the recording of the violation of the physical infrastructure constraint, wherein the corrective action comprises recording metadata describing the telemetry events that correspond to violations of the EDC constraint, and wherein recording the metadata describing the telemetry events comprises, with the microcontroller, retrieving for inclusion in the metadata values from one or more registers of the microcontroller indicating physical infrastructure values monitored by the microcontroller.

19. The method of claim 1, wherein the metadata includes a code to represent the EDC constraint.

20. The method of claim 1, wherein the corrective action comprises profiling the telemetry events by classifying the telemetry events based on the metadata.

* * * * *